(12) United States Patent
Fastow et al.

(10) Patent No.: US 9,530,103 B2
(45) Date of Patent: Dec. 27, 2016

(54) COMBINING OF RESULTS FROM MULTIPLE DECODERS

(71) Applicant: Cypress Semiconductor Corporation, San Jose, CA (US)

(72) Inventors: Richard M. Fastow, Cupertino, CA (US); Jens Olson, Saratoga, CA (US); Chen Liu, Woodridge, IL (US); Ojas A. Bapat, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 517 days.

(21) Appl. No.: 13/856,614

(22) Filed: Apr. 4, 2013

(65) Prior Publication Data

US 2014/0304205 A1 Oct. 9, 2014

(51) Int. Cl.
*G10L 15/32* (2013.01)
*G06N 99/00* (2010.01)

(52) U.S. Cl.
CPC ............ *G06N 99/005* (2013.01); *G10L 15/32* (2013.01)

(58) Field of Classification Search
CPC .......... G10L 15/32; G10L 15/30; G10L 15/28; G10L 15/22; G10L 15/265; G10L 15/08; G10L 15/063; G10L 15/20; G10L 15/07
USPC ......... 704/256, 2, 4, 251, E15.049, 231,704/E15.046, E15.047
See application file for complete search history.

(56) References Cited

U.S. PATENT DOCUMENTS

| 8,417,530 | B1 * | 4/2013 | Hayes | G06F 17/30026 704/1 |
| 9,275,635 | B1 * | 3/2016 | Beaufays | G10L 15/32 |
| 2002/0111806 | A1 | 8/2002 | Franz et al. | |
| 2002/0128820 | A1 * | 9/2002 | Goronzy | G10L 15/07 704/10 |
| 2003/0125945 | A1 * | 7/2003 | Doyle | G10L 15/01 704/246 |
| 2003/0191639 | A1 * | 10/2003 | Mazza | G10L 15/183 704/231 |
| 2003/0225579 | A1 * | 12/2003 | Wang et al. | 704/251 |

(Continued)

FOREIGN PATENT DOCUMENTS

| JP | 2007-225931 A | 9/2007 |
| JP | 2012-63536 A | 3/2012 |
| KR | 10-1154011 B1 | 6/2012 |

OTHER PUBLICATIONS

Co-pending U.S. Appl. No. 13/489,799, filed Jun. 6, 2012 (Not Published).

(Continued)

*Primary Examiner* — Eric Yen (57) ABSTRACT

Embodiments include a method, apparatus, and a computer program product for combining results from multiple decoders. For example, the method can include generating a network of paths based on one or more outputs associated with each of the multiple decoders. The network of paths can be scored to find an initial path with the highest path score based on scores associated with the one or more outputs. A weighting factor can be calculated for each of the multiple decoders based on a number of outputs from each of the multiple decoders included in the initial path with the highest path score. Further, the network of paths can be re-scored to find a new path with the highest path score based on the scores associated with the one or more outputs and the weighting factor for each of the multiple decoders.

22 Claims, 9 Drawing Sheets

(56) References Cited

U.S. PATENT DOCUMENTS

| | | | |
|---|---|---|---|
| 2004/0098259 A1* | 5/2004 | Niedermair | G10L 15/005 704/254 |
| 2004/0138885 A1* | 7/2004 | Lin | G10L 15/32 704/240 |
| 2005/0165602 A1* | 7/2005 | Cote | G10L 15/183 704/9 |
| 2006/0009980 A1* | 1/2006 | Burke | G10L 15/32 704/270 |
| 2006/0074898 A1* | 4/2006 | Gavalda | G06F 17/30684 |
| 2007/0005354 A1* | 1/2007 | Potter | G10L 15/01 704/231 |
| 2007/0250318 A1* | 10/2007 | Waserblat | G10L 15/07 704/236 |
| 2008/0059188 A1* | 3/2008 | Konopka | G10L 15/22 704/257 |
| 2008/0147404 A1* | 6/2008 | Liu | G10L 17/26 704/256.2 |
| 2009/0018833 A1* | 1/2009 | Kozat et al. | 704/257 |
| 2010/0004930 A1* | 1/2010 | Strope | G10L 15/32 704/240 |
| 2010/0145699 A1 | 6/2010 | Tian | |
| 2010/0318358 A1* | 12/2010 | Onishi | G10L 15/08 704/255 |
| 2011/0077944 A1* | 3/2011 | Seshadri | G10L 15/005 704/257 |
| 2013/0016815 A1* | 1/2013 | Odinak | H04M 3/5175 379/88.01 |
| 2014/0129218 A1* | 5/2014 | Liu | G10L 15/32 704/231 |

OTHER PUBLICATIONS

Co-pending U.S. Appl. No. 13/669,926, filed Nov. 6, 2012 (Not Published).

International Search Report and Written Opinion of the International Searching Authority for International Application No. PCT/US2014/032678, mailed Aug. 6, 2014.

English language abstract of Japanese patent publication No. 2007-225931 A.

English language abstract of Japanese patent publication No. 2012-63536 A.

English language abstract of Korean patent publication No. 10-1154011 B1.

* cited by examiner

COMBINING OF RESULTS FROM MULTIPLE DECODERS

BACKGROUND

Field

Embodiments included herein generally relate to parallel or concurrent decoding. More particularly, embodiments relate to combining results from multiple decoders to find an accurate decoded solution.

Background

The performance of data pattern recognition systems such as, for example, speech recognition systems can be improved by operating multiple recognition engines in parallel or concurrently and then combining the results from each of the multiple recognition engines. These improvements can be attributed to optimizations implemented in each of the multiple recognition engines for a particular task or condition (e.g., a portion of a speech recognition process) such that the combination of the results from each of the recognition engines can provide a solution for the data pattern recognition process. However, there are at least two drawbacks with this type of recognition system.

First, power consumption increases proportionately with the number of recognition engines. This can degrade battery lifetime in devices, especially mobile devices, implementing the recognition system with multiple recognition engines. Second, the combination of the results from each of the recognition engines may not provide a solution with equal or greater accuracy as compared to a solution provided by a single recognition engine. Thus, the recognition system not only provides an inaccurate solution based on the results from the multiple recognition engines, but also provides the inaccurate solution at the expense of additional power consumption.

SUMMARY

Therefore, there is a need to combine multiple results from multiple decoders to find an accurate decoded solution. This, in turn, avoids additional power consumption by the recognition system to re-run the decoding process on the multiple decoders to find the accurate decoded solution.

An embodiment includes a method for combining results from multiple decoders. The method can include generating a network of paths based on one or more outputs associated with each of the multiple decoders. The network of paths can be scored to find an initial path with the highest path score based on scores associated with the one or more outputs. A weighting factor can be calculated for each of the multiple decoders based on a number of outputs from each of the multiple decoders included in the initial path with the highest path score. The network of paths can be re-scored to find a new path with the highest path score based on the scores associated with the one or more outputs and the weighting factor for each of the multiple decoders. Further, the method can include generating a hypothesis for each of the one or more outputs associated with each of the multiple decoders and tagging each of the one or more outputs in the hypothesis based on a respective decoder generating each of the one or more outputs.

Another embodiment includes an apparatus for combining results from a plurality of decoders. Each of the plurality of decoders is configured to generate one or more outputs. A combining module is configured to receive the one or more outputs and to generate a network of paths based on one or more outputs associated with each of the plurality of decoders. The combining module is configured to score the network of paths to find an initial path with the highest path score based on scores associated with the one or more outputs. The combining module is also configured to calculate a weighting factor for each of the plurality of decoders based on a number of outputs from each of the plurality of decoders included in the initial path with the highest path score. Further, the combining module is configured to re-score the network of paths to find a new path with the highest path score based on the scores associated with the one or more outputs and the weighting factor for each of the plurality of decoders.

A further embodiment includes a computer program product for combining results from multiple decoders. The computer program product has a computer readable medium having stored therein one or more sequences of one or more instruction for execution by one or more processors to perform a method for combining results from multiple decoders. The method can include the following: generating a network of paths based on one or more outputs associated with each of the multiple decoders; scoring the network of paths to find an initial path with the highest path score based on scores associated with the one or more outputs; calculating a weighting factor for each of the multiple decoders based on a number of outputs from each of the multiple decoders included in the initial path with the highest path score; and, re-scoring the network of paths to find a new path with the highest path score based on the scores associated with the one or more outputs and the weighting factor for each of the multiple decoders. The method can also include generating a hypothesis for each of the one or more outputs associated with each of the multiple decoders and tagging each of the one or more outputs in the hypothesis based on a respective decoder generating each of the one or more outputs.

Further features and advantages of embodiments of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to person skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the scope of the invention. Rather, the scope of the invention is defined by the appended claims.

It would be apparent to a person skilled in the relevant art that the embodiments, as described below, can be implemented in many different forms of software, hardware, firmware, and/or the entities illustrated in the figures. Thus, the operational behavior of embodiments of the present invention will be described with the understanding that modifications and variations of the embodiments are possible, given the level of detail presented herein.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of a person skilled in the relevant art to effect such feature, structure, or characteristic in connection with other embodiments whether or not explicitly described.

1. EXEMPLARY DECODER SYSTEM

Figure 1:
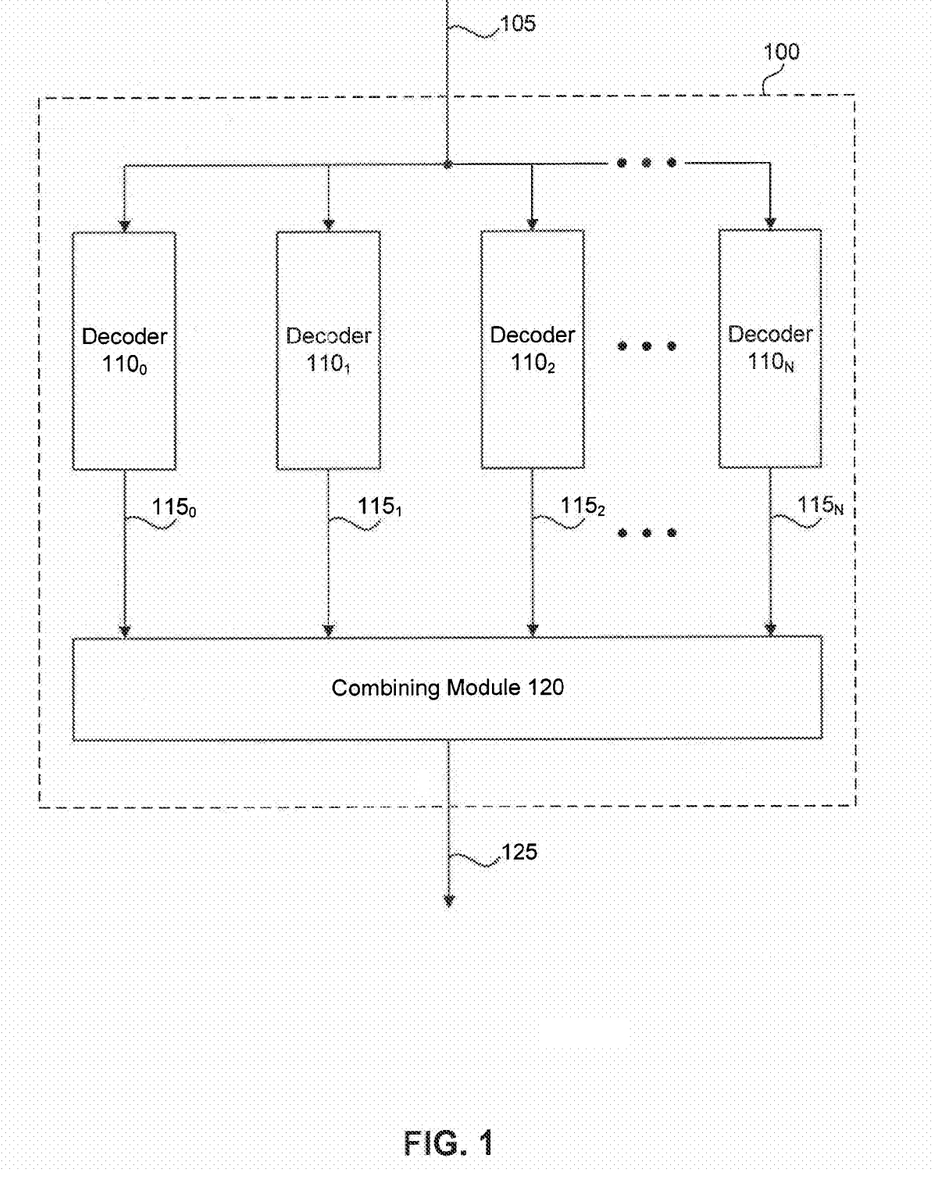
FIG. 1 is an illustration of an exemplary decoder system in which embodiments can be implemented.

FIG. 1 is an illustration of an exemplary decoder system 100 in which embodiments described herein can be implemented. Decoder system 100 includes decoders $110_0$-$110_N$ and a combining module 120. Each of decoders $110_0$-$110_N$ receives an input 105, processes input 105, and passes its output or result $115_0$-$115_N$ to combining module 120, according to an embodiment of the present invention. In an embodiment, combining module 120 processes each of results $115_0$-$115_N$ from decoders $110_0$-$110_N$, respectively, over time to generate an output 125.

For explanation and example purposes, decoder system 100 can be used in a speech recognition process. In an embodiment, input 105 can receive an utterance in a language which is not known a priori, where each of decoders $110_0$-$110_N$ processes the utterance using a different language model. The language model is not shown in FIG. 1, but can be implemented within or external to one or more of decoders $110_0$-$110_N$. Combining module 120 can receive each of results $115_0$-$115_N$ from decoders $110_0$-$110_N$, respectively. Results $115_0$-$115_N$ can be, for example, decoded words from one or more different languages based on the decoder's language models. In an embodiment, combining module 120 "strings" one or more results $115_0$-$115_N$ together over time to generate a decoded phrase or sequence of words—e.g., based on one or more of the language models.

Exemplary details on a speech recognition decoder configured to process an utterance based on a language model (or an acoustic model) can be found in U.S. patent application Ser. No. 13/489,799, filed Jun. 6, 2012, titled "Acoustic Processing Unit," which is incorporated herein by reference in its entirety.

In another example, decoder system 100 can be used to decode an accent which is not known a priori, where each of decoders $110_0$-$110_N$ processes an utterance associated with accent using a different accent model. In an embodiment, input 105 can receive an utterance in an accent which is not known a priori, where each of decoders $110_0$-$110_N$ processes the utterance using a different accent model. The accent model is not shown in FIG. 1, but can be implemented within or external to one or more of decoders $110_0$-$110_N$. Combining module 120 can receive each of results $115_0$-$115_N$ from decoders $110_0$-$110_N$, respectively. Results $115_0$-$1150_N$ can be, for example, decoded words from one or more different accents based on the decoder's accent models. In an embodiment, combining module 120 "strings" one or more results $115_0$-$115_N$ together over time to generate a decoded phrase or sequence of words—e.g., based on one or more of the accent models.

Exemplary details on a speech recognition decoder configured to process an utterance based on an accent model can be found in U.S. patent application Ser. No. 13/669,926, filed Nov. 6, 2012, titled "Recognition of Speech with Different Accents," which is incorporated herein by reference in its entirety.

In yet another example, decoder system 100 can be used to decode an utterance from a context or domain which is not known a priori, where each of decoders $110_0$-$110_N$ processes the utterance using a different context or domain. In an embodiment, input 105 can receive an utterance in a context or domain which is not known a priori, where each of decoders $110_0$-$110_N$ processes the utterance using a different context or domain. The context or domain is not shown in FIG. 1, but can be implemented within or external to one or more of decoders $110_0$-$110_N$. Combining module 120 can receive each of results $115_0$-$115_N$ from decoders $110_0$-$110_N$, respectively. Results $115_0$-$1150_N$ can be, for example, decoded words from one or more different context or domains based on the decoder's contexts or domains. In an embodiment, combining module 120 "strings" one or more results $115_0$-$115_N$ together over time to generate a decoded phrase or sequence of words based—e.g., based on one or more of the contexts or domains.

Based on the description herein, a person skilled in the relevant art will recognize that the embodiments described herein can be used with other decoder and data pattern recognition applications such as, for example and without limitation, handwriting recognition and image processing applications. These other decoder and data pattern recognition applications are within the scope and spirit of the embodiments described herein.

2. EXEMPLARY COMMUNICATION ENVIRONMENT FOR THE DECODER SYSTEM

Figure 2:
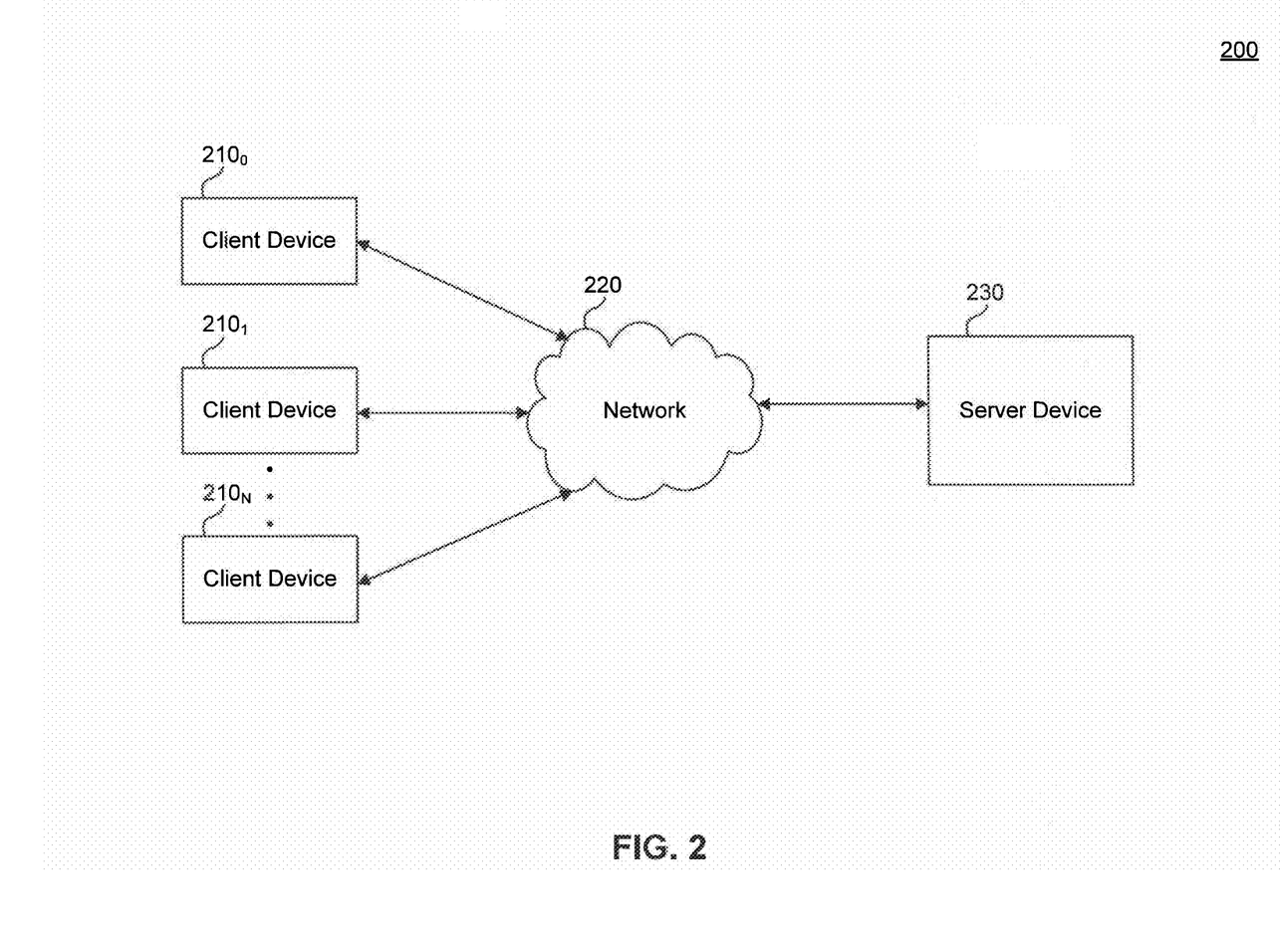
FIG. 2 is an illustration of an exemplary communication system in which a decoder system can be implemented.

FIG. 2 is an illustration of an exemplary communication system 200 in which decoder system 100 of FIG. 1 can be implemented. Communication system 200 includes client devices 210₀-210_N that are communicatively coupled to a server device 230 via a network 220.

Client devices 210₀-210_N can be, for example and without limitation, mobile phones, personal digital assistants (PDAs), laptops, other similar types of electronic devices, or a combination thereof.

Server device 230 can be, for example and without limitation, a telecommunication server, a web server, or other similar types of database servers. In an embodiment, server device 230 can have multiple processors and multiple shared or separate memory components such as, for example and without limitation, one or more computing devices incorporated in a clustered computing environment or server farm. The computing process performed by the clustered computing environment, or server farm, can be carried out across multiple processors located at the same or different locations. In an embodiment, server device 230 can be implemented on a single computing device. Examples of computing devices include, but are not limited to, a central processing unit, an application-specific integrated circuit, or other types of computing devices having at least one processor and memory.

Further, network 220 can be, for example and without limitation, a wired (e.g., Ethernet) or a wireless (e.g., Wi-Fi and 3G) network that communicatively couples client devices 210₀-210_N to server device 230.

In an embodiment, decoders 110₀-110_N and combining module 120 in decoder system 100 of FIG. 1 can be implemented in one or more of client devices 210₀-210_N, server device 230, or a combination thereof. For example, decoders 110₀-110_N and combining module 120 can be implemented in each of client devices 210₀-210_N, where each of client devices 210₀-210_N can receive an utterance from a user, process the utterance, and generate an output or result (e.g., output 125 of FIG. 1). In another example, decoders 110₀-110_N and combining module 120 can be implemented in server device 230, where server device 230 can receive an utterance from one or more client devices 210₀-210_N via network 220, process the utterance, and transmit an output or result (e.g., output 125 of FIG. 1) to one or more client devices 210₀-210_N via network 220. In yet another example, decoders 110₀-110_N and combining module 120 can be implemented in both client devices 210₀-210_N and server device 230, where each of client devices 210₀-210_N can receive an utterance and transmit the outputs from decoders 110₀-110_N (e.g., results 115₀-115_N of FIG. 1) to server device 230 via network 220. Server device 230 can process the utterance and transmit an output or result (e.g., output 125 of FIG. 1) to each of client devices 210₀-210_N via network 220.

In an embodiment, communication system 200 can be a mobile telecommunication system (e.g., 3G and 4G mobile telecommunication systems), in which mobile devices (e.g., client devices 210₀-210_N) can communicate with one another (e.g., via speech and data services) with the use of a mobile telecommunication network (e.g., network 220) and a mobile network server (e.g., server device 230). Based on the description herein, a person skilled in the relevant art will recognize that the embodiments described herein can be used with other communication systems and environments such as, for example and without limitation, local area networks, wide area networks, and intranets. These other communication systems and environments are within the scope and spirit of the embodiments described herein.

3. EMBODIMENT OF A METHOD FOR COMBINING RESULTS FROM MULTIPLE DECODERS

Figure 3:
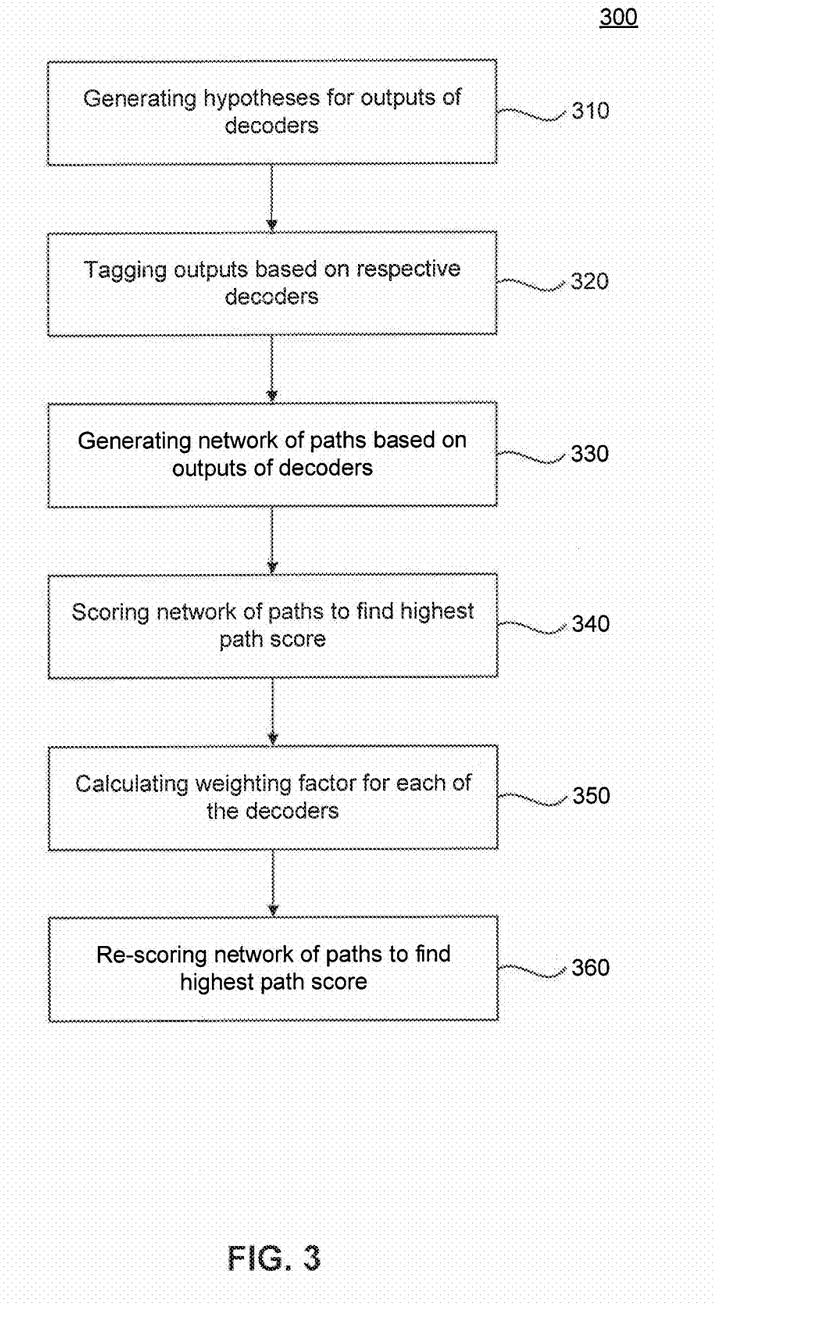
FIG. 3 is an illustration of an embodiment of a method for combining results from multiple decoders.

FIG. 3 is an illustration of an embodiment of a method 300 for combining results from multiple decoders. Method 300 can be implemented, for example, in decoder system 100 of FIG. 1. In an embodiment, method 300 can be implemented in combining module 120 of FIG. 1.

For explanation and example purposes, method 300 will be described in the context of a speech recognition system. The speech recognition system has four decoders (e.g., decoders 110₀-110_N of FIG. 1), in which each of the decoders has a different accent model to decode an utterance and provides a decoded output consisting of one or more words over time. A combining module (e.g., combining module 120) combines the results of the four decoders to output an accurate decoded solution—e.g., a decoded solution based on one of the accent models. Based on the description herein, a person skilled in the relevant art will recognize that method 300 can be applied to other data pattern recognition applications.

In reference to FIG. 3, in step 310, a hypothesis is generated for one or more outputs associated with each of the decoders. The one or more outputs represent, for example, one or more respective words associated with an utterance received by the decoders (e.g., via input 105 of FIG. 1). For each of the decoder outputs, a hypothesis can be made based on an N-list of words that best represents the utterance, where N is a positive integer. In an embodiment, techniques such as a single-best hypothesis, an N-best list hypothesis, or a lattice of hypotheses can be used to generate the hypothesis for the one or more outputs associated with each of the decoders. The hypothesis generates a probability score (also referred to herein as a "score") for each of the one or more outputs associated with each of the decoders.

Figure 4:
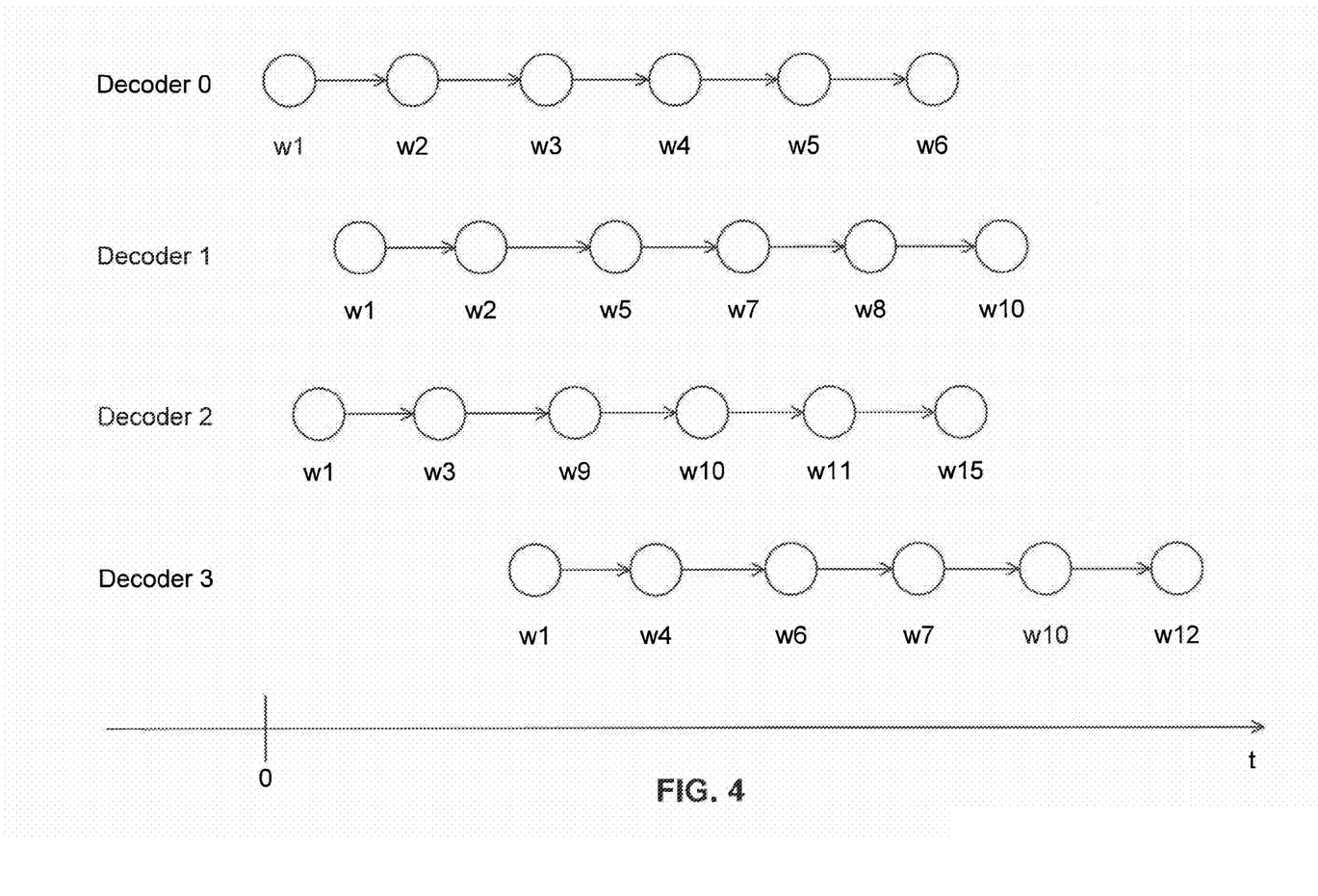
FIG. 4 is an illustration of example hypotheses associated with one or more outputs from multiple decoders.

FIG. 4 is an illustration of example hypotheses associated with one or more outputs of four decoders—Decoder 0, Decoder 1, Decoder 3, and Decoder 4. Over time, the hypothesis for Decoder 0 includes words w1, w2, w3, w4, w5, and w6. Words w1, w2, w3, w4, w5, and w6 are generated by Decoder 0 based on a first accent model and an utterance received by Decoder 0. Similarly, over time, the hypothesis for Decoder 1 includes words w1, w2, w5, w7, w8, and w10, which are generated based on a second accent model and the utterance received by Decoder 1—the same utterance received by Decoder 0. Decoders 2 and 3 generate their respective hypotheses based on a third and a fourth accent model, respectively, and the same utterance received by Decoders 0 and 1. In an embodiment, the hypotheses can be generated by each of Decoders 0-3 (e.g., decoders 110₀-110_N of FIG. 1), where a score is calculated for each of the one or more outputs associated with each of the decoders. Further, in an embodiment, the hypotheses can be staggered in time as illustrated in FIG. 4.

Figure 5:
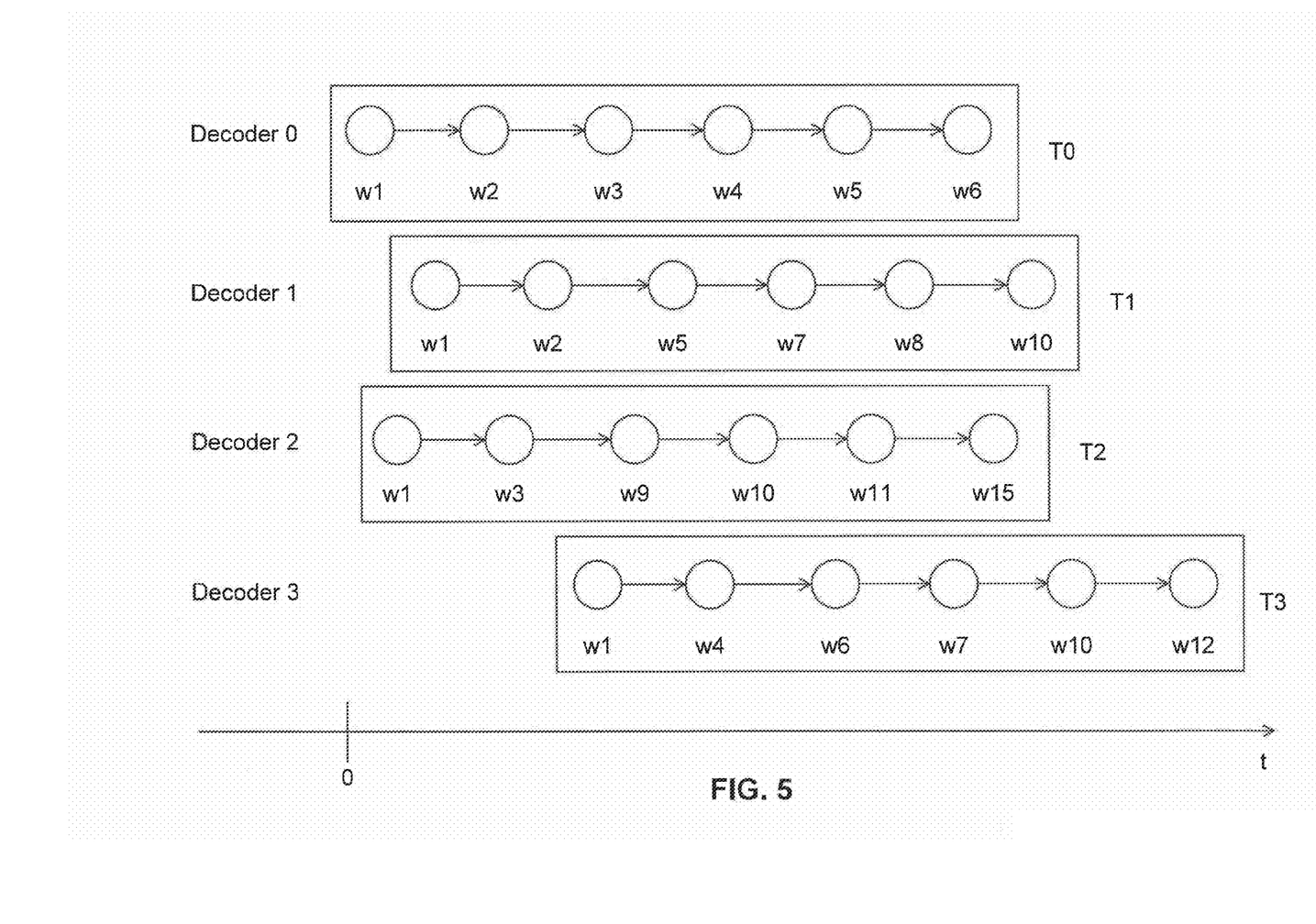
FIG. 5 is an illustration of example tags applied to one or more outputs from multiple decoders.

In step 320, each of the one or more outputs in the hypothesis is tagged based on a respective decoder generating each of the one or more outputs. FIG. 5 is an illustration of example tags applied to each of the hypotheses for Decoders 0-3. The one or more outputs associated with Decoder 0 are tagged with an identifier "T0." Similarly, the one or more outputs associated with Decoders 1, 2, and 3 are tagged with identifiers "T1," "T2," and "T3," respectively.

Figure 6:
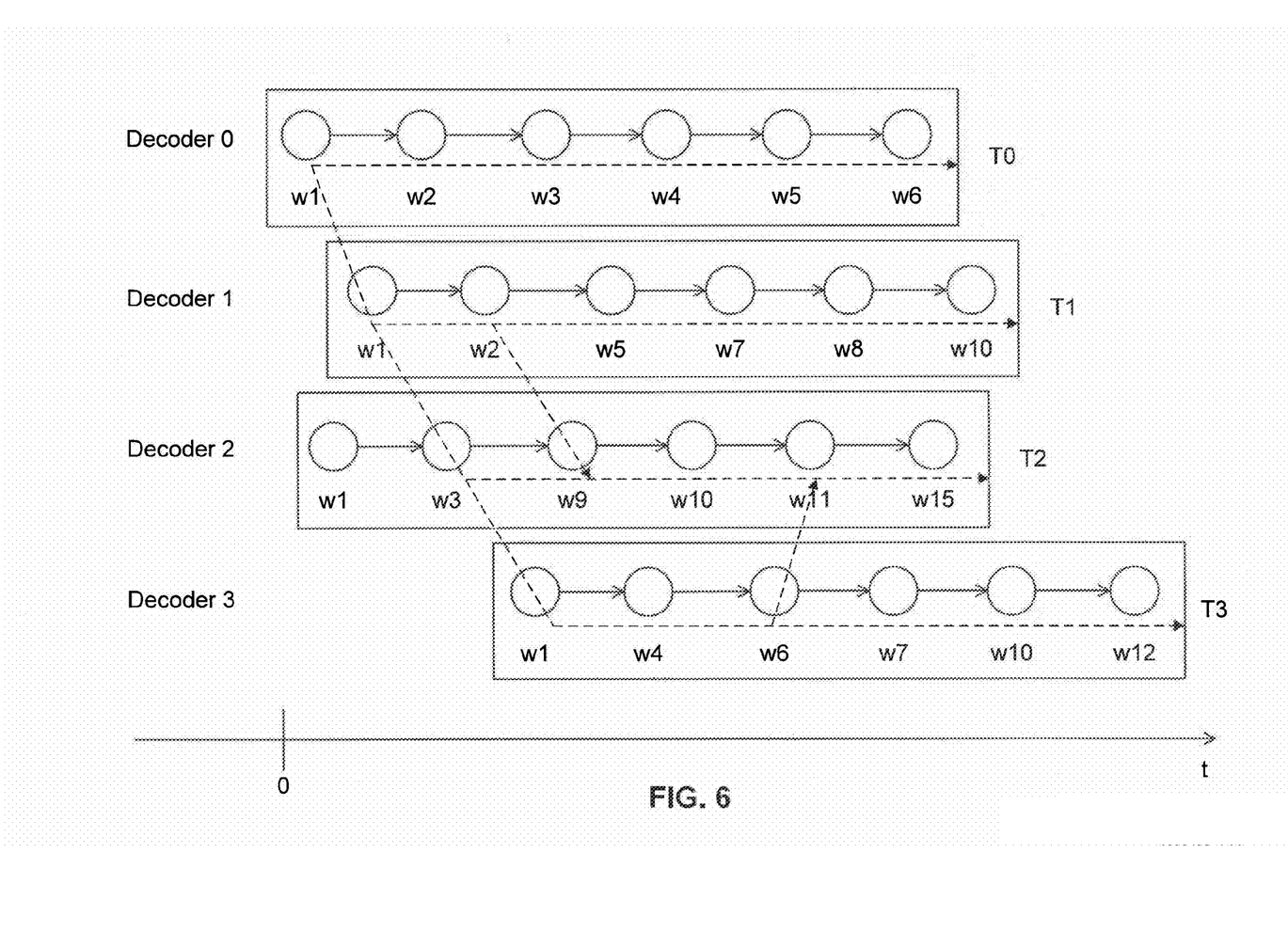
FIG. 6 is an illustration of an example word lattice for hypotheses associated with one or more outputs from multiple decoders.

In step 330, a network of paths is generated based on the one or more outputs associated with each of the multiple decoders. In an embodiment, a graph or a lattice can be used to generate the network of paths. FIG. 6 is an illustration of an example word lattice for the hypotheses of Decoders 0-3. Each of the dotted lines represents a possible path that can be explored in the word lattice. In an embodiment, each of the paths in the word lattice is formed in a time-ascending, sequential order. For example, a path can include the time-ascending, sequential word order: (T0, w1)→(T1, w1)→(T2, w3)→(T3, w1)→(T3, w4)→(T3, w6)→(T2, w11)→(T2, w15). All permutations of time-ascending, sequential paths in the word lattice can be explored, according to an embodiment of the present invention.

In step 340, the network of paths is scored to find an initial path with the highest path score based on scores associated with the one or more outputs. As noted above, each of the one or more outputs associated with each of the decoders includes a probability score (or "score"). In an embodiment, the path score for a single path from the network of paths is calculated by summing the scores associated with decoder outputs that form that path. For example, the following decoder outputs can have the following probability scores:

(T0, w1)→0.55;
(T1, w1)→0.65;
(T2, w3)→0.45;
(T3, w1)→0.50;
(T3, w4)→0.60;
(T3, w6)→0.30;
(T2, w11)→0.45; and
(T2, w15)→0.40.

The time-ascending, sequential path of (T0, w1)→(T1, w1)→(T2, w3)→(T3, w1)→(T3, w4)→(T3, w6)→(T2, w11)→(T2, w15) can thus have a path score that is equal to the sum of all of the scores associated with decoder outputs that form the path. For this path, in this example, the path score is 3.90. In an embodiment, path scores are calculated for all permutations of time-ascending, sequential paths in the word lattice. The path in the word lattice that generates the highest path score is referred to herein as "the initial path with the highest path score."

Figure 7:
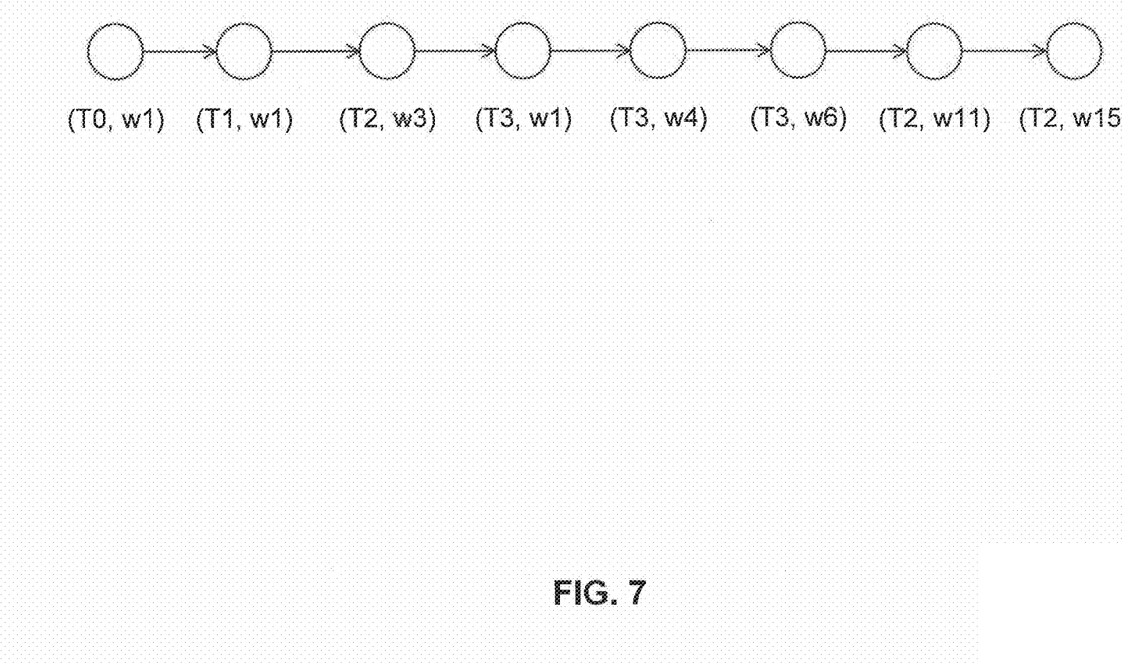
FIG. 7 is an illustration of an example path from a network of paths with the highest path score.

In step 350, a weighting factor is calculated for each of the multiple decoders based on a number of outputs from each of the multiple decoders included in the initial path with the highest path score. FIG. 7 is an illustration of an example initial path with the highest path score.

For ease of reference and exemplary purposes, the initial path with the highest path score illustrated in FIG. 7 is the same time-ascending, sequential path used in the above example. Here, Decoder 0 has one output that appears in the initial path with the highest path score—namely, (T0, w1). Decoder 1 also has one output that appears in the initial path with the highest path score—namely, (T1, w1). Decoder 2 has three outputs that appear in the initial path with the highest path score—namely, (T2, w3), (T2, w11), and (T2, w15). Further, Decoder 3 also has three outputs that appear in the initial path with the highest path score—namely, (T3, w1), (T3, w4), and (T3, w6).

Based on the number of outputs from each of Decoders 0-3 included in the initial path with the highest path score, a weighting factor can be calculated for each of Decoders 0-3. In an embodiment, since Decoders 2 and 3 have the most outputs included in the initial path with the highest path score, the weighting factors associated with these decoders can be higher than the weighting factors associated with Decoders 0 and 1. For example, Decoders 2 and 3 can each have a weighting factor of 1.40 and Decoders 0 and 1 can each have a weighting factor of 1.10. The higher weighting factor of 1.40 can be an indication that the results from Decoders 2 and 3 have a higher probability of being accurate as compared to the results from Decoders 0 and 1, according to an embodiment of the present invention.

In an embodiment, the weighting factors associated with the decoders can be adjusted based on other criteria. For example, if the result from (T3, w4) is the word "the," the weighting factor for Decoder 3 may be lowered since the word "the" can be considered a word that sounds similar across the different accent models of Decoders 0-3. On the other hand, if the result from (T1, w1) is the word "tomato," the weighting factor for Decoder 1 may be raised since the word "tomato" can be considered a distinct word that does not sound similar across the different accent models of Decoders 0-3.

In an embodiment, the system implementing method 300 (e.g., decoder system 100 of FIG. 1) can store this type of information such that it is a priori knowledge and the weighting factors for each of the Decoders 0-3 can be adjusted accordingly. In another embodiment, the system implementing method 300 can determine this type of information through experimentation such that it is a posteriori knowledge and the weighting factors for each of the Decoders 0-3 can be adjusted accordingly. Based on the description herein, a person skilled in the relevant art will recognize that, depending on the data pattern recognition application, the weighting factors associated with the decoders can be adjusted based on other criteria.

In reference to FIG. 3, in step 360, the network of paths is re-scored to find a new path with the highest path score based on the scores associated with the one or more outputs and the weighting factor for each of the multiple decoders. In an embodiment, a respective weighting factor can be added to each of the scores associated with the one or more outputs to generate weighted scores associated with the one or more outputs. In returning to the example above, the following decoder outputs can have the following probability scores:

(T0, w1)→0.55;
(T1, w1)→0.65;
(T2, w3)→0.45;
(T3, w1)→0.50;
(T3, w4)→0.60;
(T3, w6)→0.30;
(T2, w11)→0.45; and
(T2, w15)→0.40.

Also, as discussed above for exemplary purposes, Decoders 0 and 1 can each have a weighting factor of 1.10 and Decoders 2 and 3 can each have a weighting factor of 1.40. In an embodiment, the weighting factors for Decoders 0-3 can be added to their respective one or more outputs to generate one or more respective weighted scores:

(T0, w1)→0.55+1.10=1.65;
(T1, w1)→0.65+1.10=1.75;
(T2, w3)→0.45+1.40=1.85;
(T3, w1)→0.50+1.40=1.90;
(T3, w4)→0.60+1.40=2.00;
(T3, w6)→0.30+1.40=1.70;
(T2, w11)→0.45+1.40=1.85; and
(T2, w15)→0.40+1.40=1.80.

A new path score can be calculated for the above time-ascending, sequential path by summing all of the weighted scores associated with decoder outputs that form the path.

Figure 8:
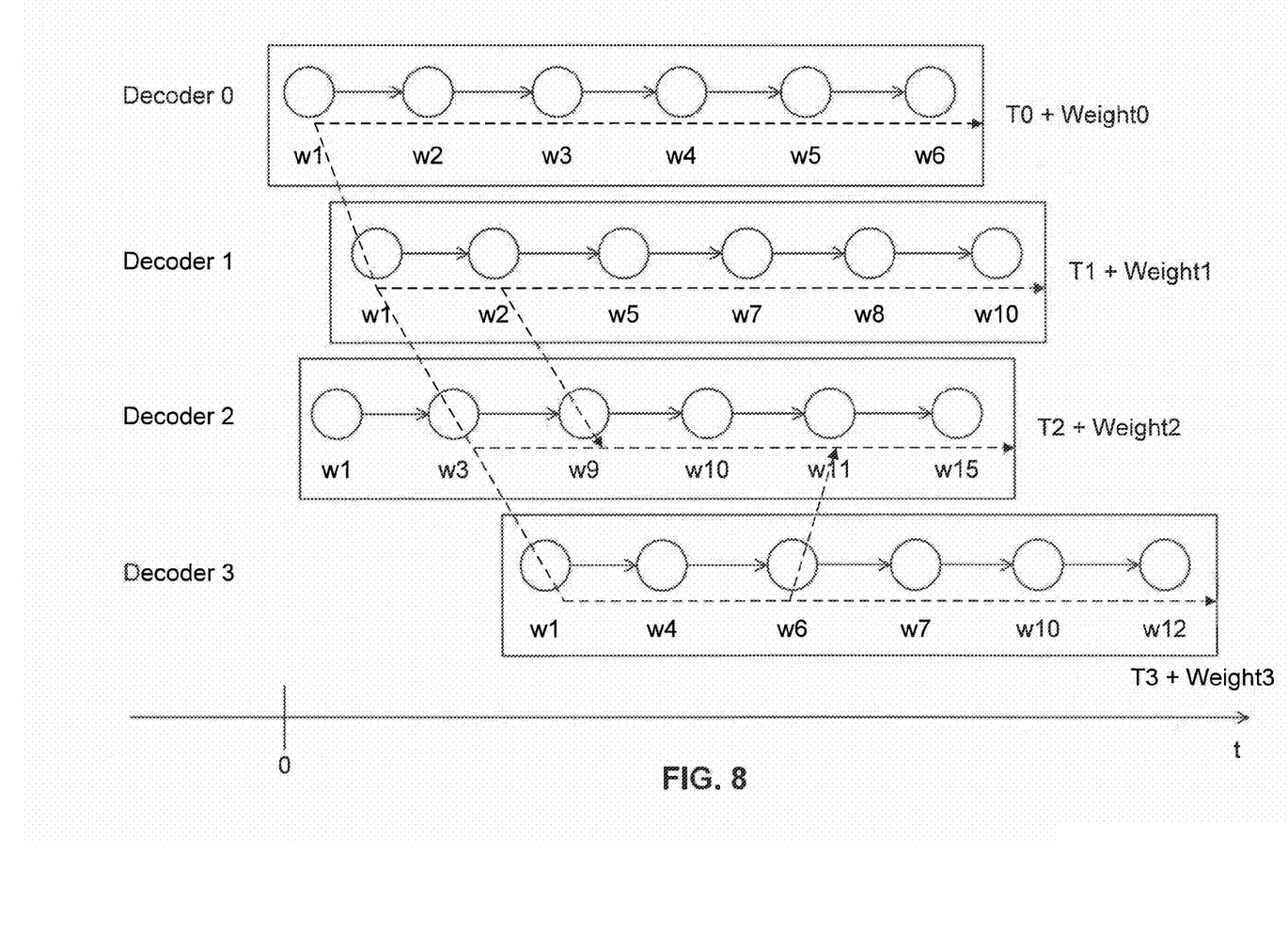
FIG. 8 is an illustration of an example word lattice for hypotheses associated with one or more outputs from multiple decoders, where each of the decoders includes a weighting factor.

For this path, in this example, the new path score is 14.50. In an embodiment, new path scores are calculated for all permutations of time-ascending, sequential paths in the word lattice. The path in the word lattice that generates the highest path score is referred to herein as "the new path with the highest path score." FIG. 8 is an illustration of an example word lattice for the hypotheses for Decoders 0-3, where the Decoders 0-3 include a weighting factor "Weight0," "Weight1," "Weight2," and "Weight3," respectively.

In another embodiment, each of the scores associated with the one or more decoder outputs can be multiplied by their respective weighting factor to generate the weighted scores. For each of the paths in the word lattice illustrated in FIG. 8, a new path score can be calculated by summing all of the weighted scores associated with decoder outputs that form the path. Similar to above, the path that generates the highest path score is the new path with the highest path score.

Based on the new path with the highest path score, the system implementing method 300 can determine which of the Decoders 0-3 has the highest probability of being accurate—e.g., which accent model from Decoders 0-3 has the highest probability of representing the utterance. In an embodiment, the accent model that has the highest probability of being accurate can be determined by selecting the decoder with the highest number of outputs included in the new path with the highest path score. This determination is similar to the analysis described above with respect to step 350 of FIG. 3. The output of the decoder with the accent model that has the highest probability of being accurate is the output of the system implementing method 300 (e.g., output 125 of FIG. 1).

One benefit of method 300 is that the search space to determine the decoded output is confined to hypotheses associated with one or more outputs of multiple decoders (e.g., results $115_0$-$115_N$ of FIG. 1) rather than an entire accent model, language model, or other types of data pattern recognition models. As a result, processing of an input (e.g., an utterance) by method 300 can be performed efficiently—e.g., less power consumption by the system implementing method 300. Another benefit, among others, is the accuracy in which the method determines the most probable decoder output for the input to the system implementing method 300. As described above, a classification technique based on the number of decoder outputs included in the path with the highest path score is used to determine weighting factors for each of the multiple decoders. The weighting factors can be adjusted on various criteria (e.g., words that sound similar across different accent models) to ensure that proper weighting factors, and thus overall accuracy, are attributed to the decoders.

4. EXEMPLARY COMPUTER SYSTEM

Figure 9:
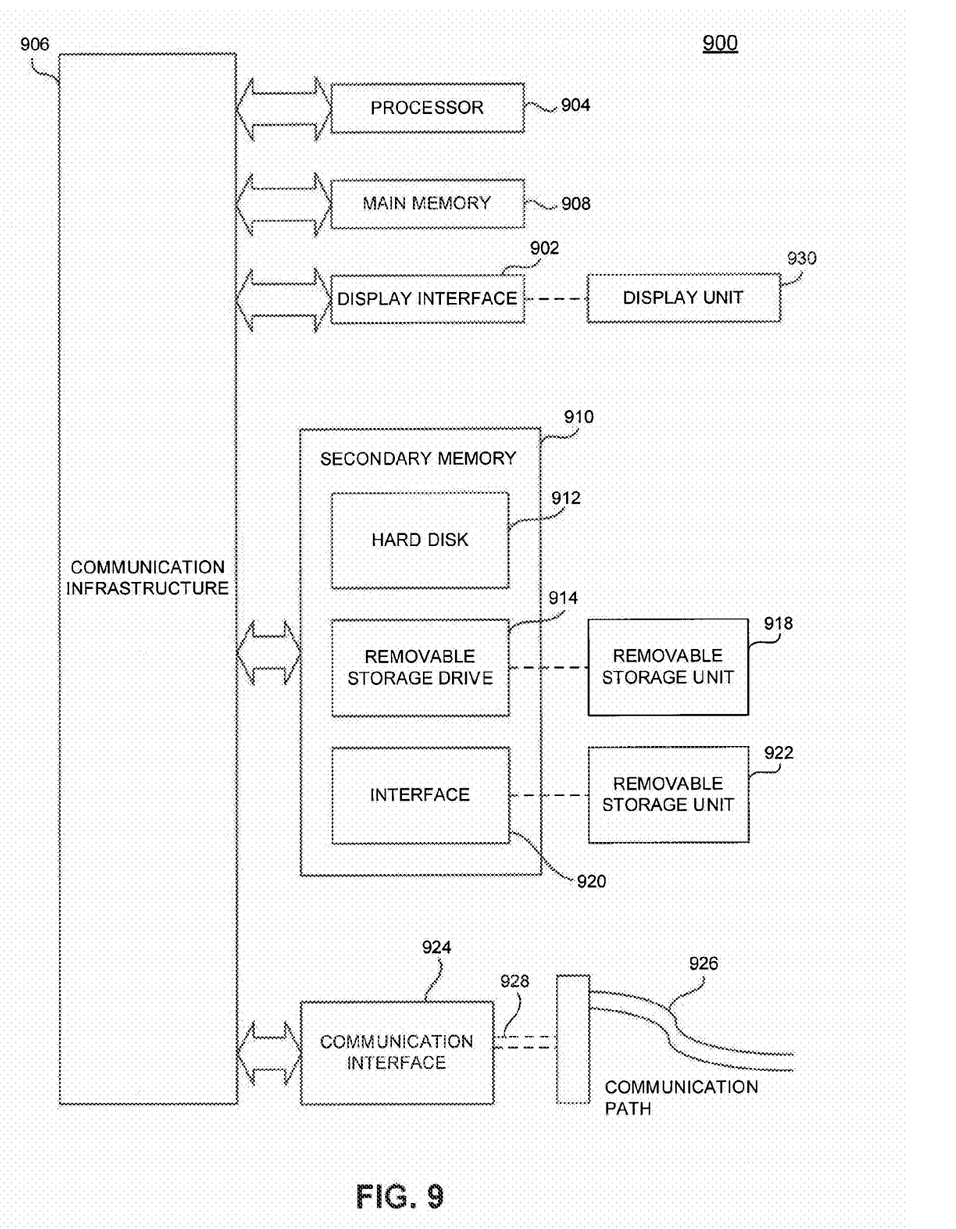
FIG. 9 is an illustration of an example computer system in which embodiments, or portions thereof, can be implemented as computer readable code.

Various aspects of embodiments of the present invention may be implemented in software, firmware, hardware, or a combination thereof. FIG. 9 is an illustration of an example computer system 900 in which embodiments of the present invention, or portions thereof, can be implemented as computer-readable code. For example, the method illustrated by flowchart 300 of FIG. 3 can be implemented in system 900. Various embodiments of the present invention are described in terms of this example computer system 900. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/cm schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core that is embodied in program code and can be transformed to hardware as part of the production of integrated circuits.

Computer system 900 includes one or more processors, such as processor 904. Processor 904 may be a special purpose or a general-purpose processor such as, for example, decoders $110_0$-$110_N$ of FIG. 1. Processor 904 is connected to a communication infrastructure 906 (e.g., a bus or network).

Computer system 900 also includes a main memory 908, preferably random access memory (RAM), and may also include a secondary memory 910. Secondary memory 910 can include, for example, a hard disk drive 912, a removable storage drive 914, and/or a memory stick. Removable storage drive 914 can include a floppy disk drive, a magnetic tape drive, an optical disk drive, a flash memory, or the like. The removable storage drive 914 reads from and/or writes to a removable storage unit 918 in a well-known manner. Removable storage unit 918 can comprise a floppy disk, magnetic tape, optical disk, etc. which is read by and written to by removable storage drive 914. As will be appreciated by persons skilled in the relevant art, removable storage unit 918 includes a computer-usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display unit 930.

In alternative implementations, secondary memory 910 can include other similar devices for allowing computer programs or other instructions to be loaded into computer system 900. Such devices can include, for example, a removable storage unit 922 and an interface 920. Examples of such devices can include a program cartridge and cartridge interface (such as those found in video game devices), a removable memory chip (e.g., EPROM or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices. Communications interface 924 can include a modem, a network interface (such as an Ethernet card), a communications port, a PCMCIA slot and card, or the like. Software and data transferred via communications interface 924 are in the form of signals which may be electronic, electromagnetic, optical, or other signals capable of being received by communications interface 924. These signals are provided to communications interface 924 via a communications path 926. Communications path 926 carries signals and can be implemented using wire or cable, fiber optics, a phone line, a cellular phone link, a RF link or other communications channels.

In this document, the terms "computer program medium" and "computer-usable medium" are used to generally refer to tangible media such as removable storage unit 918, removable storage unit 922, and a hard disk installed in hard disk drive 912. Computer program medium and computer-usable medium can also refer to tangible memories, such as main memory 908 and secondary memory 910, which can be memory semiconductors (e.g., DRAMs, etc.). These computer program products provide software to computer system 900.

Computer programs (also called computer control logic) are stored in main memory 908 and/or secondary memory 910. Computer programs may also be received via communications interface 924. Such computer programs, when executed, enable computer system 900 to implement embodiments of the present invention as discussed herein. In particular, the computer programs, when executed, enable processor 904 to implement processes of embodiments of the present invention, such as the steps in the method illustrated by flowchart 300 of FIG. 3 can be implemented in system 900, discussed above. Accordingly, such computer programs represent controllers of the computer system 900. Where embodiments of the present invention are implemented using software, the software can be stored in a computer program product and loaded into computer system 900 using removable storage drive 914, interface 920, hard drive 912, or communications interface 924.

Embodiments are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMs, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

5. CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for combining results from multiple speech decoders, wherein each of the multiple speech decoders includes an accent model, the method comprising:
    transmitting an utterance to a server device over a wireless medium, wherein the server device is configured to:
        generate a network of paths based on one or more outputs associated with each of the multiple speech decoders, wherein each speech decoder is configured to decode an utterance to generate the one or more outputs;
        score, with a combining device, the network of paths to find an initial path with a highest path score based on scores associated with the one or more outputs;
        calculate, with the combining device, a weighting factor for each of the multiple speech decoders, wherein the weighting factor is determined by counting a number of outputs from each of the multiple speech decoders included in the initial path with the highest path score;
        adjust, with the combining device, the weighting factor for each of the multiple speech decoders based on a sound similarity of outputs across the accent models included in the multiple speech decoders;
        re-score, with the combining device, the network of paths to find a new path with another highest path score based on the scores associated with the one or more outputs and the weighting factor for each of the multiple speech decoders;
        output, with the combining device, a decoded utterance using the one or more outputs associated with the new path with the another highest path score; and
    receiving the decoded utterance from the server device over the wireless medium.

2. The method of claim 1, wherein the server device is further configured to generate a hypothesis for each of the one or more outputs associated with each of the multiple speech decoders; and
    tag each of the one or more outputs in the hypothesis based on a respective speech decoder generating each of the one or more outputs.

3. The method of claim 2, wherein, when generating the hypothesis, the server device is configured to apply a single-best hypothesis, an N-best list hypothesis, or a lattice of hypotheses to the one or more outputs associated with each of the multiple speech decoders.

4. The method of claim 1, wherein, when generating the network of paths, the server device is configured to generate a graph or a lattice based on the one or more outputs associated with each of the multiple speech decoders.

5. The method of claim 1, wherein, when scoring the network of paths, the server device is configured to:
sum the scores of the one or more outputs associated with each path in the network of paths to generate a path score; and
select a path from the network of paths with the highest path score to find the initial path with the highest path score.

6. The method of claim 1, wherein, when calculating the weighting factor, the server device is configured to apply a higher weighting factor to a first speech decoder than a second speech decoder when the first speech decoder has a higher number of outputs associated with the initial path with the highest path score than the second speech decoder.

7. The method of claim 1, wherein, when re-scoring the network of paths, the server device is configured to:
add a respective weighting factor to each of the scores associated with the one or more outputs to generate weighted scores associated with the one or more outputs;
sum the weighted scores of the one or more outputs associated with each path in the network of paths to generate a path score; and
select a path from the network of paths with the another highest path score to find the new path with the another highest path score.

8. The method of claim 1, wherein the server device is configured to adjust the weighting factor for each of the multiple speech decoders by decreasing the weighting factor based on the sound similarity of the outputs across the accent models included in the multiple speech decoders.

9. The method of claim 1, wherein the server device is configured to adjust the weighting factor for each of the multiple speech decoders by increasing the weighting factor based on a sound dissimilarity of the outputs across the accent models included in the multiple speech decoders.

10. An apparatus comprising:
a plurality of speech decoders, wherein each of the plurality of speech decoders includes an accent model, each configured to decode an utterance received from a client device over a wireless medium to generate one or more outputs; and
a combining device configured to receive the one or more outputs and to:
generate a network of paths based on the one or more outputs;
score the network of paths to find an initial path with a highest path score based on scores associated with the one or more outputs;
calculate a weighting factor for each of the plurality of speech decoders, wherein the weighting factor is determined by counting a number of outputs from each of the plurality of speech decoders included in the initial path with the highest path score;
adjust, with the combining device, the weighting factor for each of the plurality of speech decoders based on a sound similarity of outputs across the accent models in the plurality of speech decoders;
re-score the network of paths to find a new path with another highest path score based on the scores associated with the one or more outputs and the weighting factor for each of the plurality of speech decoders;
output a decoded utterance using the one or more outputs associated with the new path with the another highest path score; and
transmit the decoded utterance to the client device over the wireless medium.

11. The apparatus of claim 10, wherein the combining module is configured to:
generate a hypothesis for each of the one or more outputs associated with each of the plurality of speech decoders; and
tag each of the one or more outputs in the hypothesis based on a respective speech decoder generating each of the one or more outputs.

12. The apparatus of claim 11, wherein the hypothesis comprises a single-best hypothesis, an N-best list hypothesis, or a lattice of hypotheses.

13. The apparatus of claim 10, wherein the network of paths comprises a graph or a lattice based on the one or more outputs associated with each of the plurality of speech decoders.

14. The apparatus of claim 10, wherein the initial path with the highest path score comprises:
summation of the scores of the one or more outputs associated with each path in the network of paths to generate a path score; and
selection of a path from the network of paths with the highest path score to find the initial path with the highest path score.

15. The apparatus of claim 10, wherein the weighting factor comprises application of a higher weighting factor to a first speech decoder than a second speech decoder when the first speech decoder has a higher number of outputs associated with the initial path with the highest path score than the second speech decoder.

16. The apparatus of claim 10, wherein the new path with the another highest path score comprises:
addition of a respective weighting factor to each of the scores associated with the one or more outputs to generate weighted scores associated with the one or more outputs;
summation of the weighted scores of the one or more outputs associated with each path in the network of paths to generate a path score; and
selection of a path from the network of paths with the another highest path score to find the new path with the another highest path score.

17. A non-transitory tangible computer readable medium having stored therein one or more sequences of one or more instructions for execution by one or more processors to perform a method for combining results from multiple speech decoders, wherein each of the multiple speech decoders includes an accent model, the method comprising:
transmitting an utterance to a server device over a wireless medium, wherein the server device is configured to:
generate a network of paths based on one or more outputs associated with each of the multiple speech decoders, wherein each speech decoder is configured to decode an utterance to generate the one or more outputs;
score, with a combining device, the network of paths to find an initial path with a highest path score based on scores associated with the one or more outputs;
calculate, with the combining device, a weighting factor for each of the multiple speech decoders, wherein the weighting factor is determined by counting a number of outputs from each of the multiple speech decoders included in the initial path with the highest path score;

adjust, with the combining device, the weighting factor for each of the multiple speech decoders based on a sound similarity of outputs across the accent models in the multiple speech decoders;

re-score, with the combining device, the network of paths to find a new path with another highest path score based on the scores associated with the one or more outputs and the weighting factor for each of the multiple speech decoders;

output, with the combining device, a decoded utterance using the one or more outputs associated with the new path with the another highest path score; and receiving the decoded utterance from the server device over the wireless medium.

18. The non-transitory tangible computer readable medium of claim 17, wherein the server device is further configured to:

generate a hypothesis for each of the one or more outputs associated with each of the multiple speech decoders; and tag each of the one or more outputs in the hypothesis based on a respective speech decoder generating each of the one or more outputs.

19. The non-transitory tangible computer readable medium of claim 17, wherein, when generating the network of paths, the server device is configured to generate a graph or a lattice based on the one or more outputs associated with each of the multiple speech decoders.

20. The non-transitory tangible computer readable medium of claim 17, wherein, when scoring the network of paths, the server device is configured to:

sum the scores of the one or more outputs associated with each path in the network of paths to generate a path score; and select a path from the network of paths with the highest path score to find the initial path with the highest path score.

21. The non-transitory tangible computer readable medium of claim 17, wherein, when calculating the weighting factor, the server device is configured to apply a higher weighting factor to a first speech decoder than a second speech decoder when the first speech decoder has a higher number of outputs associated with the initial path with the highest path score than the second speech decoder.

22. The non-transitory tangible computer readable medium of claim 17, wherein, when re-scoring the network of paths, the server device is configured to:

add a respective weighting factor to each of the scores associated with the one or more outputs to generate weighted scores associated with the one or more outputs;

sum the weighted scores of the one or more outputs associated with each path in the network of paths to generate a path score; and select a path from the network of paths with the another highest path score to find the new path with the another highest path score.

* * * * *